United States Patent Office 3,840,461
Patented Oct. 8, 1974

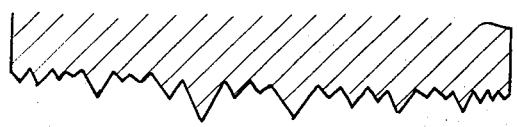
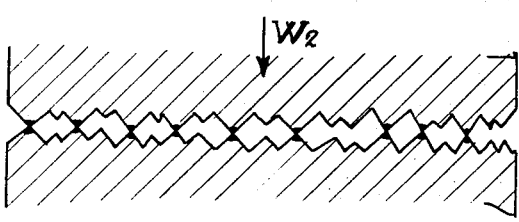
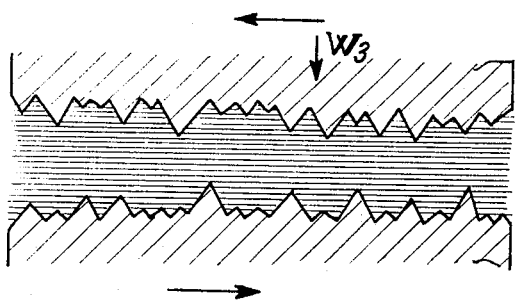

3,840,461
GLASS POWDER LUBRICANT DISPERSIONS
Luis Arizmendi Espunes, Madrid, Spain, assignor to Instituto de Quimica Fisica Rocasolano, Madrid, Spain
Continuation-in-part of application Ser. No. 75,478, Sept. 25, 1970. This application Oct. 13, 1972, Ser. No. 297,494
Int. Cl. C10m 1/10, 3/02
U.S. Cl. 252—21                                3 Claims

ABSTRACT OF THE DISCLOSURE

A method of lubricating solid surfaces at room temperature with a composition comprising glass powder dispersed uniformaly in a lubricant carrier selected from the group consisting of lubricating oils and lubricating greases.

BACKGROUND OF THE INVENTION

This application is a Continuation-In-Part of my abandoned application Serial No. 75,478 filed Sept. 25, 1970 entitled "Improvements in the Manufacture of Lubricants for High Pressures With Solid Additives Incorporated."

SUMMARY OF THE INVENTION

The present invention relates in particular to the lubricating oils that carry in suspension finely pulverized glass, it being the object of the present improvements to make possible the extension of the field of application of the said lubricants to the greasing of moving mechanisms, like bearings and others subjected to very high pressure, at room or moderate temperature, and to obtain in permanent form a substantially equal concentration in the whole of the fluid mass, preventing to the maximum degree the sedimentation of the additive.

The invention is based on three principal applications: (a) processes of extrusion of metals; (b) glass as an additive of lubricating oils for high pressure applications, and (c) glass as an additive for lubricating greases for-high-pressure applications. The first of the applications indicated has constituted the subject-matter, in different forms, of Patents of different authors, although in such Patents no mention is made of the basis of their operation; but this will not constitute the subject of a rescription on our part.

The action of glass as an additive for lubricating oils for use in automation and in other moving machinery under very high pressure at room or moderate temperature, which we believe to constitute an authentic innovation is recorded in Spanish Patent of Invention No. 356,-585, in the name of the present applicant. As a phase prior to the application to which reference has been made, the author used all the means within his reach to find out whether the process had been used for the purpose described by other authors, either in Spain or abroad, but always with negative results. Nor do the general works on the art cite any case of such application.

The author has reached the development of the process that is the subject of the present invention thanks to a theory of logical reasonings, supported by experimental proof, and which, in synthesis, are expounded hereinbelow.

In order to enable the invention to be better interpreted, in what follows a joint description is given of its theoretical principle and practical application, reference being made to the figures included in the attached drawings.

BRIEF DESCRIPTION OF THE DRAWING

FIG. 1 is an illustration of apparently smooth surfaces of two parts;

FIG. 2 is an illustration of the actual roughness existing on apparently smooth surfaces when viewed at sufficiently high magnification;

FIGS. 3 and 4 illustrate two mating surfaces in contact with each other when viewed at sufficiently high magnification;

FIG. 5 illustrates the effect of applying a lubricating material between two mating surfaces under low pressure;

DESCRIPTION OF THE PREFERRED EMBODIMENTS

A solid surface, apparently smooth (FIG. 1) on being superimposed on another similar solid surface would give rise, in theory, to a real surface of contact equal to the apparent surface of contacts: that is to say, $S_r = S_a$.

However, any metal surface, no matter how smooth it may appear to the naked eye, when observed under a microscope with sufficient amplifying power, presents a series of peaks and valleys (FIG. 2), so that, on superimposing two metal surfaces contact takes place only at small number of points: that is to say that $S_r \ll S_a$. If it is a question, for example, of two flat pieces of steel brought into contact under a pressure W1 of a few kgs./cm.², the real surface of contact (FIG. 3) is of the order of 1000th of the apparent surface: $S_r = 0.001 S_a$ On increasing the pressure to W2 between both pieces up to the order of several Tons/cm.², the rear surface of contact can increase until it is of the order of 100th of the apparent surface: that is to say $S_r = 0.01 S_a$, there existing for each load an equilibrium that in theory is given by the elastic distortion but which, in practice, thanks to the plastic distortion also existing, causes it to deviate from a determined simple law, because of there entering into play the nature of the material. In these cases the minimum distance $h_0$ between both surfaces is zero, since a certain contact already exists (FIG. 4).

In these circumstances, if the experimenter wishes to cause a surface to slide in a direction contrary to the other, as it is the case of the present invention, he will find a force of friction that opposes itself to the said sliding. If the pressure W3 between the surfaces is relatively small, the force of friction can be overcome by making use of one of the conventional lubricating oils, derived, for example, from petroleum (FIG. 5), and in such case contact will practically not exist between both surfaces, the distance $h_0 \gg 0$ and we shall find ourselves in what is termed the region of *hydrodynamic lubrication*, in which the coefficient of friction is of the order of $\mu = 0.001$ due to the shearing of the oil itself. If in our example we consider a SAE 140 oil of those used for gear boxes, and consequently of the most viscuous, its viscosity will be of the order of $\eta = 27$ centipoises.

Figure 6:
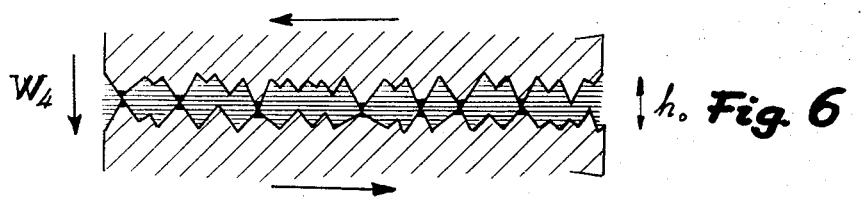
FIG. 6 illustrates the effect of applying extreme pressure to the surfaces illustrated in FIG. 5.

However, if we successively increase the pressure W4, we shall reach a situation in which, despite the oil, contact between the metals will be produced at some points;

$h_0$ will again be zero, from the region of hydrodynamic lubrication we shall have passed to the *limit* and from this to that of *extreme* pressure (FIG. 6). The coefficient of friction will then be of the order of $\mu=0.1$ to 1 and the rupture of the lubricating film is produced over large zones of the sliding surfaces.

In this regime of forces it is necessary to have recourse to the use of what are termed extreme pressure additives which, in general, are difficult to prepare, have a high price, are generally vesicant, and the principle of their operation is that of a controlled corrosion, but a corrosion that can escape from this control by the effect of the temperature itself or by continuous use, giving rise on occasions to a premature deterioration of the metal pieces.

Other types of additives, or rather of solid lubricants, although they are efficacious specially in very specific cases, nevertheless have limitations that result from the very high degree of purity that is required and from the presence of humidity or of oxidation at high temperatures.

On the contrary, the glasses, considered as the solids with properties most similar to those of the liquids, since they do not possess a crystalline structure nor a fixed ordering of their atoms, and bonds, to which fact they owe their rather wide zone of melting points at temperatures lower than those developed at the peaks of the roughnesses of the metals by friction, could be a good solution to the problem since, in addition, they are, in general, inert with respect to water vapour and to oxygen, and have practically no corrosive properties with respect to metals, are easy to prepare and handle, and consequently their price is low.

Figure 7:
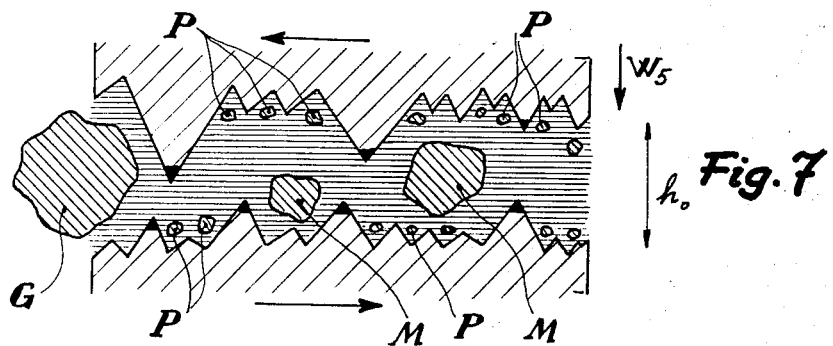
FIG. 7 illustrates the effect of using glass particles having a large size range in a lubricant.

In FIG. 7 there is shown the mechanism of the operation of glass as a suspension in conventional lubricating oils, demonstrated by experiment at room temperature in the best known test machines. The excessively large particles (G) do not have easy access to the process, since they are very much greater in size than the height of the roughness of the metal. The very small particles (P) although they enter easily, do not act by themselves alone, since they are normally localized in the cold valleys between peaks. The intermediate sizes (M) are those which are really efficacious, since the particles of this size make contact with the very hot peaks by friction of the roughnesses on the pressure W5 operating and on becoming melted they replace at these points the film of oil that has become ruptured. Thus, the efficacious size range of the glass particles depends upon the finish of the sliding surfaces and upon the load to which the surfaces are exposed. The distance $H_0>0$ and the coefficient of friction are found, according to the case, between $\mu=0.02$ to 0.4.

Figure 8:
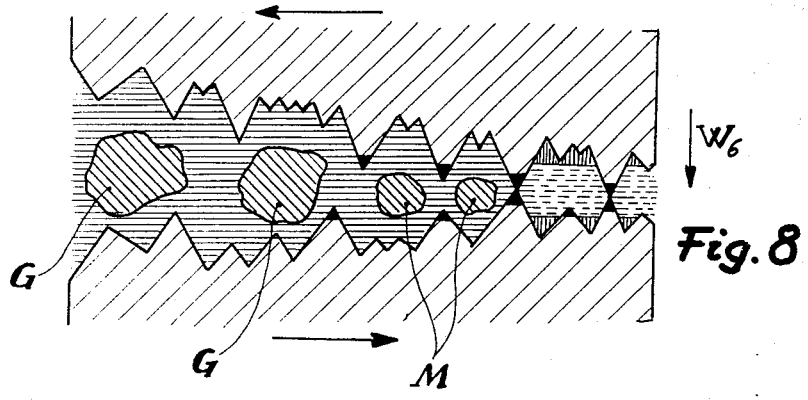
FIG. 8 illustrates the effect of using glass particles having a narrower size range in a lubricant.
Figure 9:
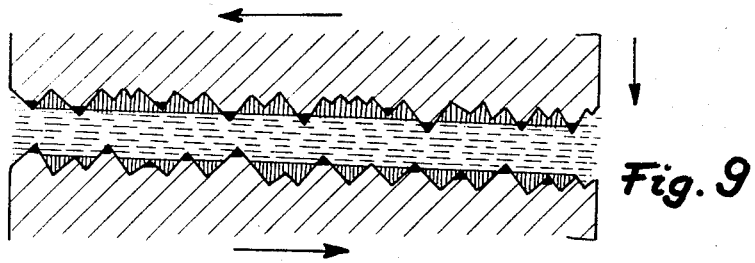
FIG. 9 illustrates the effect of the lubricant in reducing friction and wear, and increasing the welding load.
Figure 10:
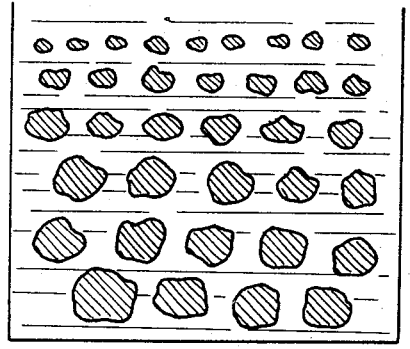
FIGS. 10-12 illustrate the effect of particle size and viscosity of the medium upon the particle distribution.
Figure 11:
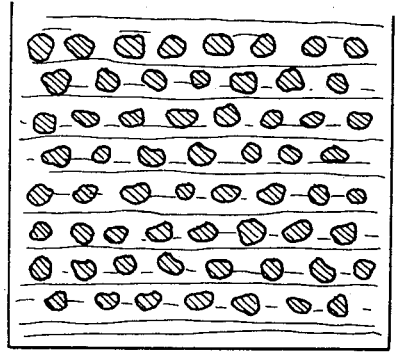

However, experiments have shown us that a mechanism exists by means of which the entry is possible, up to certain limits, of particles of a size successively greater (FIG. 8) with the resultant successive increase of $h_0$ on determined pressures W6 being reached and with them determined temperatures at which the molten glass by friction has replaced as a lubricant the oil which, in these conditions, has lost its properties, the hydrodynamic region of lubrication being again reached in ample zones of the solids that are sliding. This is manifested by a reduction of the coefficient of friction and of wear and tear and by a notable increase in the welding load (FIG. 9). It should be observed that in these conditions the viscosity of a current glass acquires values of the order of $\eta 900°$ C.$=7.9\times10^4$ centipoises.

Since in the hydrodynamic region the equations of Reynolds are valid, that which is obtained for the point contact between four balls

$$(h_0/r)^{1/2}=(8/3)\eta\omega r^2/W_T$$

in which $r$ is the radius of the balls; $\eta$ the viscosity of the fluids; $\omega$ the velocity of rotation and $W_T$ the total load; indicates that the value of $h_0$, separation between surfaces, depends on the square of the viscosity $\eta^2$ and that as we have seen this has for molten glass an order of magnitude almost ten thousand times greater.

If we now examine, from the practical point of view, the preparation of the suspensions of glass powder in lubricating oils, we shall see (FIG. 10) that at the end of a certain time the particles of glass would be distributed by sizes. As shown in FIGS. 7, 8, and 10–12, the glass particles may have a quasi-spherical shape, and their dynamics obeying the equation:

$$V_m=(\rho_s-\rho_1)gD^2/18\eta$$

in which $V_m$ is the maximum velocity of sedimentation, $\rho_s$ and $\rho_1$ the densities of the glass and of the oil; $g$ the value of the acceleration of gravity; D the diameter of the particles of glass, and $\eta$ the viscosity of the oil.

In this manner, at the end of a certain time, the larger particles or the agglomerations of smaller particles will occupy the bottom of the vessel. Particles of successively smaller sizes, on the transpiry of longer time, will tend to go to the bottom. Nevertheless, there will exist for each oil (depending on its viscosity) a spectrum of sizes that will be maintained in suspension for a long time (FIG. 11), although these sizes on occasions may not coincide with those that we previously defined as optimum for the mechanism of aperture of the system in friction, and consequently for the efficacy of the glass powder.

In summary, the existence of a suspension of the sizes efficacious for the improvement of the lubrication is perfectly feasible, but with a manifest dependence on the viscosity of the oils. Fortunately, the utilization of glass powder, as an element for improving lubricating properties, is specially indicated for very viscous oils of the type of those employed in gear boxes and similar mechanisms.

Figure 12:
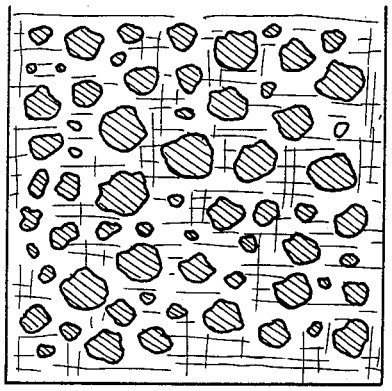

The logical reasoning, followed up to now, leads us to the fact that the problem of the sedimentation of the particles of glass has an obvious solution in the utilization of semi-solid greases that are used to lubricate bearings, and in pastes of all types that are employed in a diversity of uses, such as being embedded in pieces, etc., etc. In these conditions, FIG. 12 shows how it is possible to maintain in the body of a grease an adequate distribution of sizes of particles during practically indefinite times, and how this distribution is maintained thanks to the high value of the viscosity of the grease or of the paste, which causes the value of the velocity of sedimentation to tend to be zero. This is thus a subsequent and more perfect application of glass powder as an extreme pressure additive at moderate temperatures. The chemical composition of the glasses used having some relation with the nature of the metal to be lubricated in order to secure a good adhesion.

Tests and experiments have led to the important conclusion that the additive proposed notably improves the action of conventional high-pressure additives, with which it can be mixed.

Consequently, an important quality of the present invention in relation with its use, at room temperature or at moderate temperature with oils, greases or pastes, consists in its function of improving the properties that are presented by conventional high-pressure additives. Thus, for example, we may mention that by adding our additive to an oil with additives in the form of sulphur compounds, the load-wear index that is obtained by this method is increased by 37 percent; and that when added to a grease or paste containing additives consisting of compounds of a laminar type, it improves its action, represented by the load-wear index, by 32 percent. The reason for this property consists of the fact that the glass commences to act in the presence of conventional additives when the conditions imposed on the surfaces in contact exceed the possibilities of such additives, so that it constitutes, so to say, a safety measure when the limits envisaged for such conventional additives are exceeded.

As simple examples that do not imply the exclusion of other possibilities within what is indicated in this description, there are included below some representative cases of materials corresponding to the present invention.

Composition and Properties of the Glasses

Table I indicates the intervals at which each one of the components have formed part of the glasses experimentally employed.

TABLE I

| Components: | Percentage (by weight) |
|---|---|
| $SiO_2$ | 0–73 |
| $Na_2O$ | 0–23 |
| $B_2O_3$ | 0–100 |
| $Al_2O_3$ | 0–3 |
| CaO | 0–22 |
| $Fe_2O_3$ | 0–29 |
| BaO | 0–2 |
| $K_2O$ | 0–2 |
| MgO | 0–4 |

Example I

| Components: | Percentage (by weight) |
|---|---|
| $SiO_2$ | 64 |
| $Na_2O$ | 14 |
| CaO | 22 |

The Littletone point corresponding to this glass is 870° C.

Example II

| Components: | Percentage (by weight) |
|---|---|
| $SiO_2$ | 69 |
| $Na_2O$ | 21 |
| CaO | 10 |

The Littletone point corresponding to this glass is 670° C.

Example III

| Components: | Percentage (by weight) |
|---|---|
| $SiO_2$ | 66 |
| $Na_2O$ | 26 |
| $Fe_2O_3$ | 8 |

The Littletone point corresponding to this glass is 631° C.

Example IV

| Components: | Percentage (by weight) |
|---|---|
| $SiO_2$ | 49 |
| $Na_2O$ | 23 |
| $Fe_2O_3$ | 28 |

The Littletone point corresponding to this glass is 653° C.

The glasses of the four previous examples were in the form of quasispherical particles that passed the 400 meshes.

Example V

| Components: | Percentage (by weight) |
|---|---|
| $SiO_2$ | 71 |
| CaO | 11 |
| $Na_2O$ | 14 |
| MgO | 4 |

The Littletone point corresponding to this glass is 727° C.

Example VI

| Components: | Percentage (by weight) |
|---|---|
| $SiO_2$ | 71 |
| $Al_2O_3$ | 3 |
| CaO | 7 |
| MgO | 4 |
| $Na_2O$ | 14 |
| $K_2O$ | 1 |

The Littletone point of this glass is 721° C.

These two glasses were tested separately for particles of different diameters.

In Table III there are shown, by way of example, the welding loads reached with the glass of Example V in the machine of the four balls.

TABLE II

| Size of the particles (in microns) | Welding load (in kilograms) |
|---|---|
| 1 | 175 |
| 10 | 230 |
| 20 | 225 |
| 30 | 230 |
| 40 | 180 |
| 50 | 170 |
| 74 | 155 |
| 88 | 145 |
| 105 | 140 |
| 125 | 140 |

These results show that the effectiveness of the glass as an additive under these conditions, depends on the size of the particles, the optimum zone in this case being between 10 and 30 microns in diameter, and being inefficacous for values higher than 100 microns. However, the increase in size continues to be efficacious with regard to wear and tear to values of 150 microns, as has been seen in another series of tests.

Example VII

| Components: | Percentage (by weight) |
|---|---|
| $B_2O_3$ | 100 |

The Littletone point was 400° C.; the size of particles was between 10 and 20 microns and the fusion load exceeded 700 kg. in the machine of the four balls.

Composition and Actuation of the Greases

Table III shows the intervals of components in the greases exempt from additives.

TABLE III

| Components: | Percentage (by weight) |
|---|---|
| Lithium stearate | 5–25 |
| SAE–30 oil | 0–95 |
| SAE–90 oil | 0–95 |

The following examples illustrate some of the compositions tried experimentally, with the additive now included, with the values reached for each one by the fusion load and by the load-wear index, with the machine with the four balls.

Example VIII

| Components: | Percentage (by weight) |
|---|---|
| Lithium stearate | 9.4 |
| SAE–90 oil | 77.6 |
| Glass C–1 | 13.0 |

The welding load obtained was 250 kg. and the load-wear index was 41.8 kg.

Example IX

| Components: | Percentage (by weight) |
|---|---|
| Lithium stearate | 9.4 |
| SAE–90 | 77.6 |
| Glass V–2 | 13.0 |

The welding load equal to 250 kg.; load-wear index equal to 46.7 kg.

Example X

| Components: | Percentage (by weight) |
|---|---|
| Lithium stearate | 9.4 |
| SAE–90 oil | 77.6 |
| Glass B–1 | 13.0 |

Welding load equal to 760 kg.; load-wear index equal to 68.8 kg.

In these three examples, the glass C-1 is that specified in Example I; the glass V-2 corresponds to that of Example V, and the glass B-1 to that of Example VII.

The nature of the invention, together with some of its possibilities of application having been sufficiently described, it only remains to add that variations of the materials employed are possible, provided that they do not vary the fundamental characteristics of the invention which is limited only by the appended claims.

What is claimed is:

1. A method of lubricating solid surfaces under high contact pressure and at approximately room temperature which comprises applying to said surfaces a lubricating composition comprising glass powder having a particle size of 1-150 microns dispersed uniformly in a lubricant carrier selected from the group consisting of lubricating oils and lubricating greases.

2. The method of claim 1 wherein the lubricant carrier is lithium stearate grease.

3. The method of claim 1 wherein the lubricant carrier is a lubricating oil.

References Cited

UNITED STATES PATENTS

| | | | |
|---|---|---|---|
| 2,900,338 | 8/1959 | Postelnek | 252—28 |
| 3,110,669 | 11/1963 | Borg | 252—28 |
| 3,113,105 | 12/1963 | Slayter et al. | 252—28 |
| 3,485,753 | 12/1969 | Allais | 252—28 |
| 3,520,807 | 7/1970 | Cross et al. | 252—21 |

DANIEL E. WYMAN, Primary Examiner

I. VAUGHN, Assistant Examiner

U.S. Cl. X.R.

72—42; 252—28